US012630093B2

(12) United States Patent
Ahn

(10) Patent No.: US 12,630,093 B2
(45) Date of Patent: May 19, 2026

(54) MOVABLE CONSOLE FOR VEHICLE

(71) Applicants: Hyundai Motor Company, Seoul
(KR); Kia Corporation, Seoul (KR)

(72) Inventor: Gye Young Ahn, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 365 days.

(21) Appl. No.: 18/470,042

(22) Filed: Sep. 19, 2023

(65) Prior Publication Data

US 2024/0308431 A1 Sep. 19, 2024

(30) Foreign Application Priority Data

Mar. 14, 2023 (KR) ........................ 10-2023-0033402

(51) Int. Cl.
B60R 7/04 (2006.01)
(52) U.S. Cl.
CPC ..................................... B60R 7/04 (2013.01)
(58) Field of Classification Search
CPC .. B60N 3/10; B60N 3/105; B60R 7/04; B60R
7/06; B60R 2011/0007
USPC .................................. 296/24.34, 24.4, 24.46
See application file for complete search history.

(56) References Cited

U.S. PATENT DOCUMENTS

| | | | | |
|---|---|---|---|---|
| 7,481,475 B1 * | 1/2009 | Lim | ........................... | B60R 7/04 |
| | | | | 296/37.8 |
| 8,196,985 B2 * | 6/2012 | Penner | ..................... | B60R 7/04 |
| | | | | 296/24.34 |
| 8,287,021 B2 * | 10/2012 | Penner | .................... | E05B 83/16 |
| | | | | 292/336.3 |
| 11,613,213 B2 * | 3/2023 | Elsarelli | .................. | F16C 1/106 |
| | | | | 296/24.34 |
| 12,115,941 B2 * | 10/2024 | Thomas | .................... | B60R 7/04 |
| 2013/0009418 A1 * | 1/2013 | Hipshier | ................... | B60R 7/04 |
| | | | | 296/24.34 |
| 2022/0234508 A1 | 7/2022 | Ahn et al. | | |
| 2023/0226962 A1 | 7/2023 | Im et al. | | |

FOREIGN PATENT DOCUMENTS

| | | |
|---|---|---|
| KR | 20220108552 A | 8/2022 |
| KR | 20230112177 A | 7/2023 |

\* cited by examiner

*Primary Examiner* — Jason S Daniels
(74) *Attorney, Agent, or Firm* — Slater Matsil, LLP

(57) ABSTRACT

In an embodiment, a movable console for a vehicle includes
a console divided into parts in a forward/rearward direction.
The divided parts may be configured to rectilinearly move
forward or rearward relative to a vehicle body. Partition
walls may be shaped to block left and right sides of a space
between the divided parts define a storage space.

20 Claims, 9 Drawing Sheets

MOVABLE CONSOLE FOR VEHICLE

CROSS-REFERENCE TO RELATED APPLICATIONS

This application claims the benefit of Korean Patent Application No. 10-2023-0033402, filed on Mar. 14, 2023, which application is hereby incorporated herein by reference.

TECHNICAL FIELD

Embodiments of the present disclosure relate to a movable console for a vehicle.

BACKGROUND

A console is installed in a vehicle while having a space in which an item may be stored. Typically, the console is fixedly installed on a vehicle body.

However, future vehicles require a configuration in which a seat may not only move forward, rearward, leftward, and rightward but also swivel without being fixedly installed on the vehicle body, such that more various types of seat variation are possible.

Therefore, to cope with changes in positions or postures of the seat, there has been proposed a technology related to a moving console that may move without being fixed to the vehicle body.

However, because the moving console proposed in the related art is structured to move only forward and rearward, there is a limitation in terms of expandability of the storage space.

In addition, there is a problem in that because an electric mechanism is used to move the console, a control process of moving the console is complicated, and an expensive unit and controller are required.

Moreover, there is also a problem in that a gap is excessively exposed to a connection part between a bottom surface of a vehicle body and the console, which causes introduction of foreign substances, a device breakdown, contamination, and the like.

The foregoing explained as the background is intended merely to aid in the understanding of the background of the present disclosure, and is not intended to mean that embodiments of the present disclosure fall within the purview of the related art that is already known to those skilled in the art.

SUMMARY

Embodiments of the present disclosure relate to a movable console for a vehicle that improves convenience of storage by ensuring an additional storage space in the console, reduces costs by implementing a manual console movement structure, and prevents a risk of a device breakdown and contamination caused by introduction of foreign substances by improving a structure of a connection part between a vehicle body and the console.

An embodiment may solve these problems and may aim to provide a movable console for a vehicle that improves convenience of storage by ensuring an additional storage space of the console.

An embodiment may also aim to provide a movable console for a vehicle that reduces costs by implementing a manual console movement structure, and may prevent a risk of a device breakdown and contamination caused by introduction of foreign substances by improving a structure of a connection part between a vehicle body and the console.

To achieve one or more of the above-mentioned advantages/solutions, an embodiment of a movable console for a vehicle may include a console divided into parts in a forward/rearward direction. The divided parts may be configured to rectilinearly move forward or rearward relative to a vehicle body. Partition walls may be shaped to block left and right sides of a space between the divided parts to define a storage space.

The partition walls may be provided on one of the divided parts. Insertion holes may be formed in the other of the divided parts that face the partition walls. And, the partition walls may be inserted into the insertion holes.

In an embodiment, a movable console may include rail parts provided in the forward/rearward direction on a bottom surface of a vehicle body. Moving parts may be fixed to the divided parts and configured to rectilinearly move along the rail parts. A locking device may be configured to restrict positions of the divided parts by locking or unlocking the moving parts to or from the rail parts in response to an operation of a lock knob.

In an embodiment, a locking device may include a stopper disposed in the rail part and having fixing gear teeth formed in a longitudinal direction of the rail part. A locker may be provided on the moving part and having moving gear teeth formed to be directed toward the fixing gear teeth. The locker may be configured to transmit an operating force of the lock knob by way of a cable and may be configured to be moved by the operation of the lock knob so that the locker is locked to the stopper as the moving gear teeth engage with the fixing gear teeth or the locker is unlocked from the stopper as the moving gear teeth disengage from the fixing gear teeth, for example.

In an embodiment, a guide hole may be formed in the moving part. The locker may be inserted into the guide hole. And, the locker may be moved in a direction perpendicular to a longitudinal direction of the stopper.

In an embodiment, the fixing gear teeth and the moving gear teeth may each be formed in a rack gear shape.

In an embodiment, a movable console may include a trigger connected to the cable and having two opposite ends connected between the moving part and the locker by way of a hinge structure. The trigger may be configured to convert a rotational motion into a rectilinear motion of the locker while being rotated by an operating force of the cable, for example.

In an embodiment, an opening groove may be formed at an upper end of the rail part. A groove cover may be coupled to front and rear sides of the moving part. And, the groove cover may block the opening groove.

In an embodiment, a length of the groove cover in a leftward/rightward width direction may be equal to or slightly shorter than a length of the opening groove in the leftward/rightward width direction.

In an embodiment, a cover support portion may be formed on a middle portion of the rail part and may protrude inward. The groove cover may be supported on the cover support portion and may be formed in a belt shape that surrounds the cover support portion.

In an embodiment, the groove cover may be formed in a belt shape of an endless track.

In an embodiment, the console may be moved rearward in the state in which the parts of the console are separated, such that the storage space is additionally ensured between the front end part and the rear end part. Therefore, the convenience of storage may be improved, and the passenger, who is seated in the seat in the second row, may use the storage space defined in the rear end part, thereby improving the utilization of the console.

Moreover, because the divided parts of the console may be moved manually, the movement of the console need not be electrically controlled, and an expensive unit and controller are not necessarily required, which reduces costs, in comparison with a case in which the console is moved by an electric mechanism.

In addition, in an embodiment, the groove cover may block the opening groove formed in the rail part, such that introduction of foreign substances into the rail part is prevented or reduced, which prevents/reduces contamination and breakdowns of devices caused by foreign substances.

DETAILED DESCRIPTION OF ILLUSTRATIVE EMBODIMENTS

Figure 1:
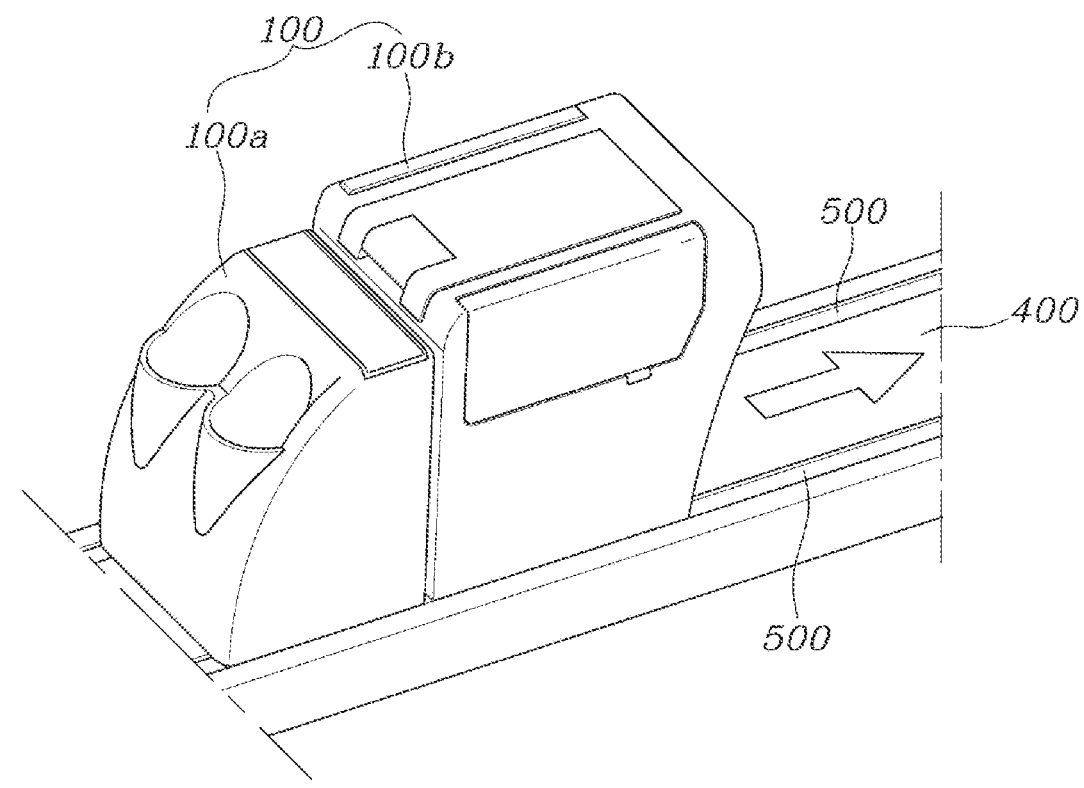
FIG. 1 is a view illustrating a movable console according to an embodiment.

Hereinafter, embodiments disclosed in the present specification will be described in detail with reference to the accompanying drawings. The same or similar constituent elements are assigned with the same reference numerals regardless of reference numerals, and the repetitive description thereof may be omitted.

The suffixes "module", "unit," "part," "device," and "portion" may be used to describe constituent elements in the following description and may be used together or interchangeably in order to facilitate the description, but the suffixes themselves do not necessarily have distinguishable meanings or functions.

In the description of the embodiments disclosed in the present specification, the specific descriptions of publicly known related technologies may be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not necessarily limited by the terms. These terms may be used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions may include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, exemplary embodiments of the present disclosure will be described in detail with reference to the accompanying drawings.

Figure 2:
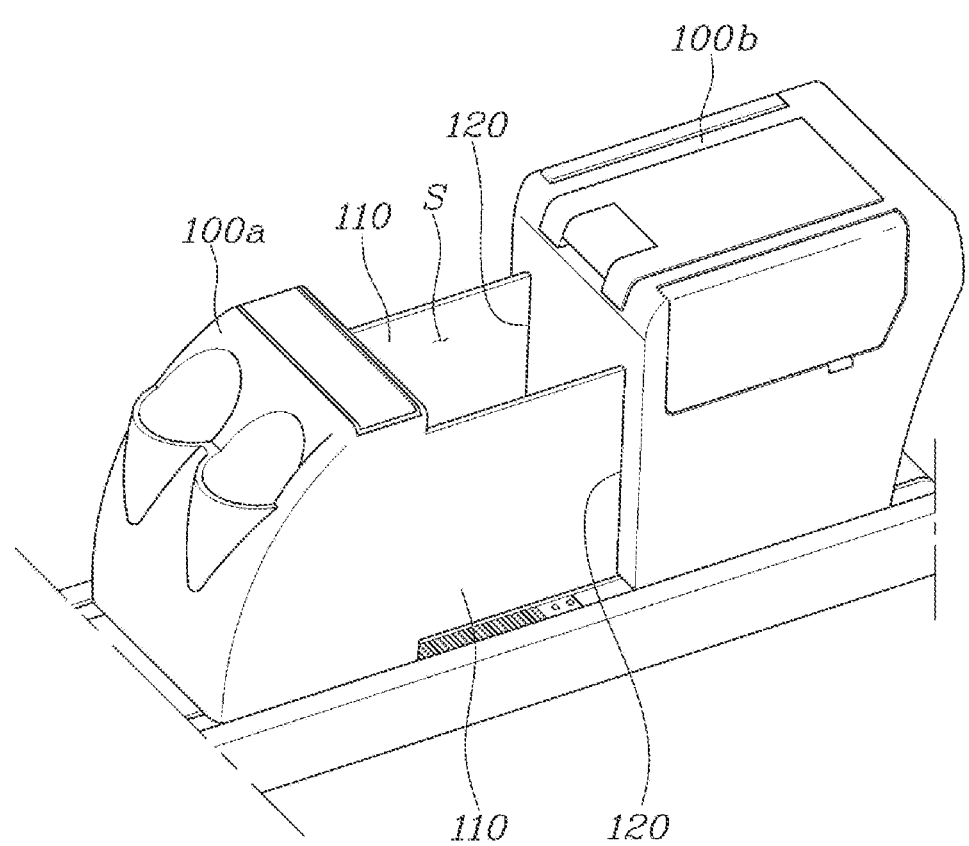
FIG. 2 is a view illustrating a shape in which a rear part of the movable console of an embodiment may be separated and moved rearward.

As shown in FIGS. 1 and 2, in an embodiment, a movable console for a vehicle may include a console 100 divided into parts in a forward/rearward direction. The divided parts may be configured to rectilinearly move forward or rearward relative to a vehicle body 400. Partition walls 110 may be shaped to block left and right sides of a space between the divided parts to define a storage space S.

With reference to FIGS. 1 and 2, the console 100 may be divided into a front end part 100a and a rear end part 100b in the forward/rearward direction.

The front end part 100a may have a storage space such as a cup holder, and the rear end part 100b may have a storage space, for example.

Further, the rear end part 100b may be separated from the front end part 100a and may move rearward. The front end part 100a may be configured to move forward or rearward.

In particular, as illustrated in FIG. 2, when the rear end part 100b moves rearward, a space S is defined between the front end part 100a and the rear end part 100b, and two opposite sides of the space S are blocked by the partition walls 110, such that the additional storage space S is defined between the front end part 100a and the rear end part 100b.

For example, a size of the console 100 may need to be small to prevent interference between a seat and the console 100 to implement a swivel motion of the seat, which may cause a lack of the storage space of the console 100.

In this case, in an embodiment, when the rear end part 100b of the console 100 moves rearward, the storage space S may be additionally ensured between the front end part 100a and the rear end part 100b, thereby improving the convenience of storage.

Moreover, when the rear end part 100b is moved rearward, a passenger, who is seated in a seat in a second row, may use the storage space S formed in the rear end part 100b, which makes it possible to further improve the utilization of the console 100.

Further, in an embodiment, the partition walls 110 may be formed on one of the divided parts, and insertion holes 120 may be formed in the other of the divided parts that faces the partition walls 110, such that partition walls 110 may be inserted into the insertion holes 120.

Figure 3:
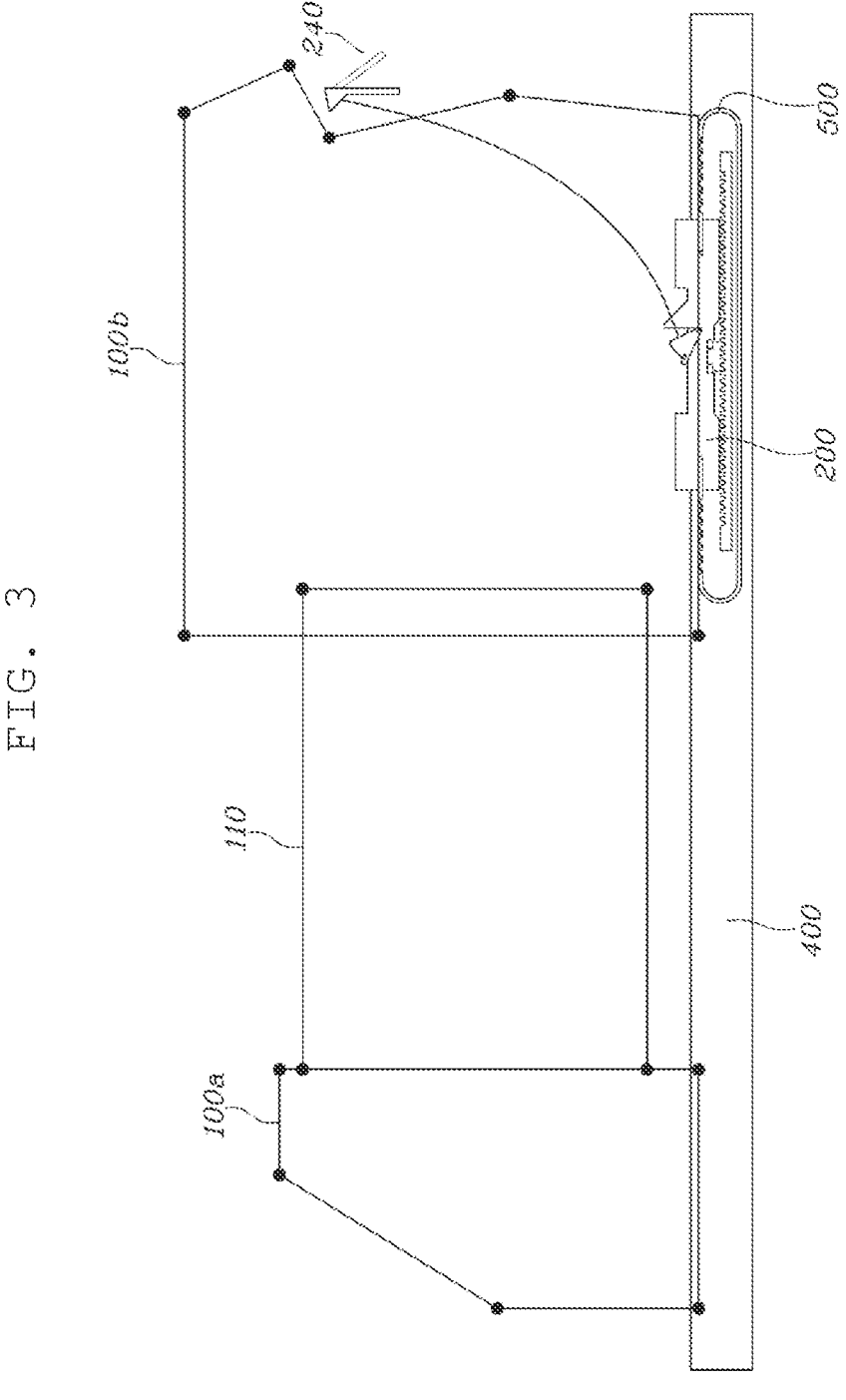
FIGS. 3 and 4 are views schematically illustrating a configuration in which a lock knob and a locking device in an embodiment are connected and a configuration in which a moving part may be connected to a vehicle body.

With reference to FIGS. 2 and 3, in an embodiment, the partition walls 110 may be each formed in a quadrangular flat plate shape and extend rearward from two opposite sides of a rear end of the front end part 100a.

Further, the insertion holes 120 may be formed at two opposite sides of a front end of the rear end part 100b and may correspond to cross-sectional shapes of the partition walls 110.

Therefore, when the rear end part 100b moves rearward, the partition walls 110 on the front end part 100a may be exposed to the outside of the insertion holes 120 and block the left and right sides between the front end part 100a and the rear end part 100b.

Meanwhile, in an embodiment, the rear end part 100b may be configured to be locked to or unlocked from the vehicle body 400 and fix the rear end part 100b at a desired position after the rear end part 100b moves.

To this end, in an embodiment, as illustrated in FIGS. 3-8, a movable console may include rail parts 300 each disposed on a bottom surface of the vehicle body 400 and may be provided in a rail shape in the forward/rearward direction. Moving parts 200 may be provided on the divided parts and configured to rectilinearly move along the rail part 300. A locking device configured to restrict positions of the divided parts by locking or unlocking the moving parts 200 to or from the rail parts 300 in response to an operation of a lock knob 240.

Figure 4:
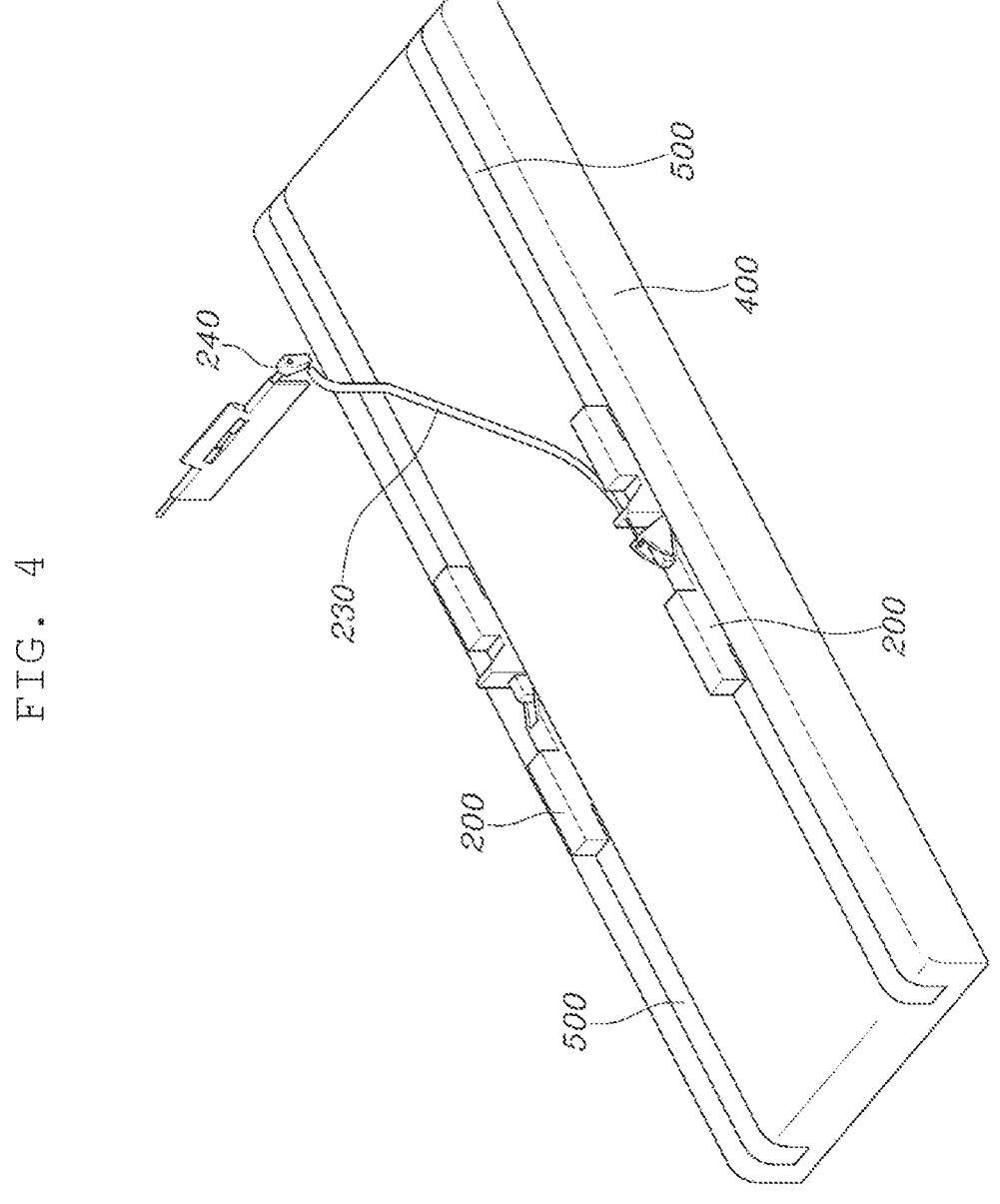
Figure 5:
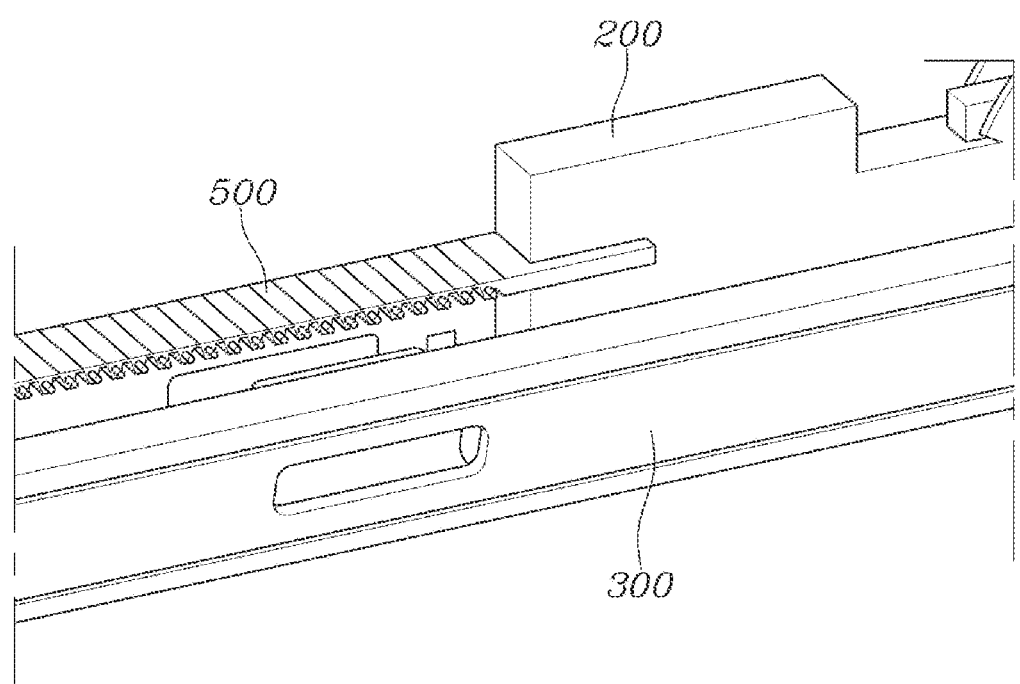
FIG. 5 is a view illustrating a shape in which a moving part may be positioned in a rail part in an embodiment.

With reference to FIGS. 3 to 5, the rail parts 300 may each have a rail shape and may be installed in the forward/rearward longitudinal direction at left and right sides of the bottom surface of the vehicle body 400. The moving parts 200 may be fixed to left and right sides of a bottom surface of the rear end part 100b in the forward/rearward longitudinal direction.

Figure 6:
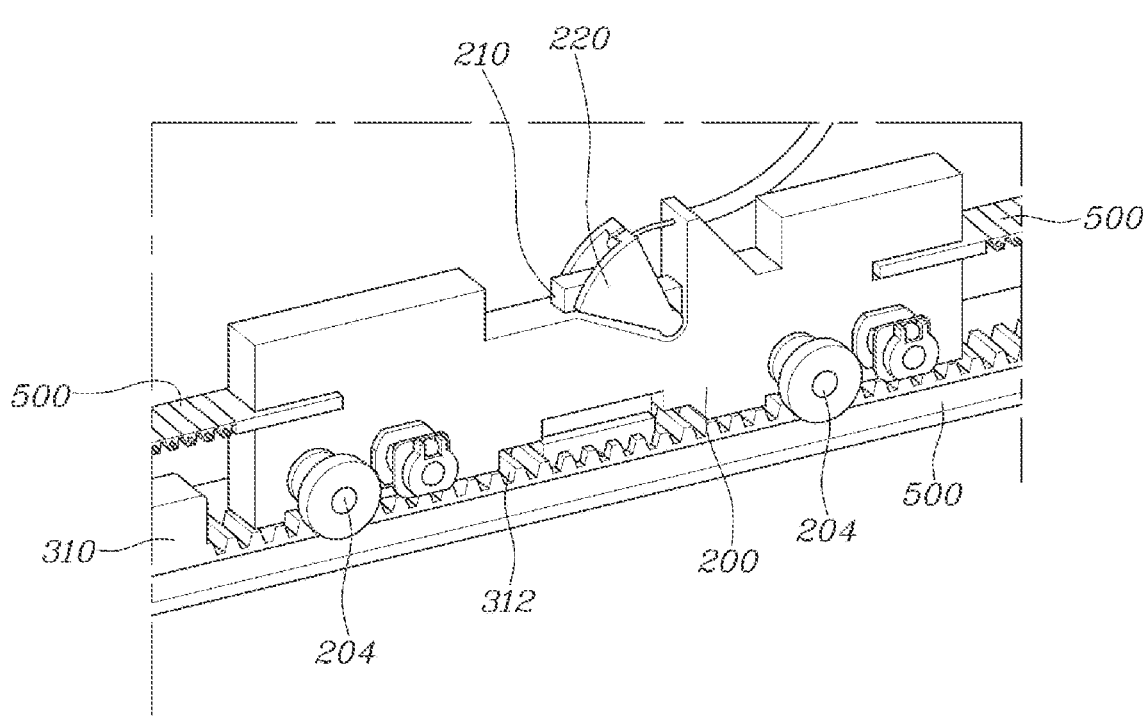
FIG. 6 is a view illustrating a state in which the rail part in FIG. 5 is removed.

Further, as shown in FIG. 6, bearing wheels 204 may be coupled to front and rear sides of the moving part 200, and the bearing wheels 204 may roll in the rail part 300.

Further, the moving parts 200 may be unlocked from the rail parts 300 by an unlocking operation of the lock knob 240. In the unlocked state, the moving parts 200 may move forward or rearward in the longitudinal direction of the rail parts 300, such that the rear end part 100b moves forward or rearward.

Further, the moving parts 200 may be locked to the rail parts 300 by a locking operation of the lock knob 240, such that the rear end part 100b is temporarily fixed to a desired position.

In an exemplary embodiment, as illustrated in FIGS. 5 to 8, a locking device may include a stopper 310 disposed in the rail part 300 and having fixing gear teeth 312 formed in a longitudinal direction of the rail part 300. A locker 210 may be provided on the moving part 200 and having moving gear teeth 212 formed to be directed toward the fixing gear teeth 312. The locker 210 may be configured to transmit an operating force of the lock knob 240 via a cable 230 and may be configured to be moved by the operation of the lock knob 240 so that the locker 210 is locked to the stopper 310 as the moving gear teeth 212 engage with the fixing gear teeth 312 or the locker 210 is unlocked from the stopper 310 as the moving gear teeth 212 disengage from the fixing gear teeth 312, for example.

Figure 7:
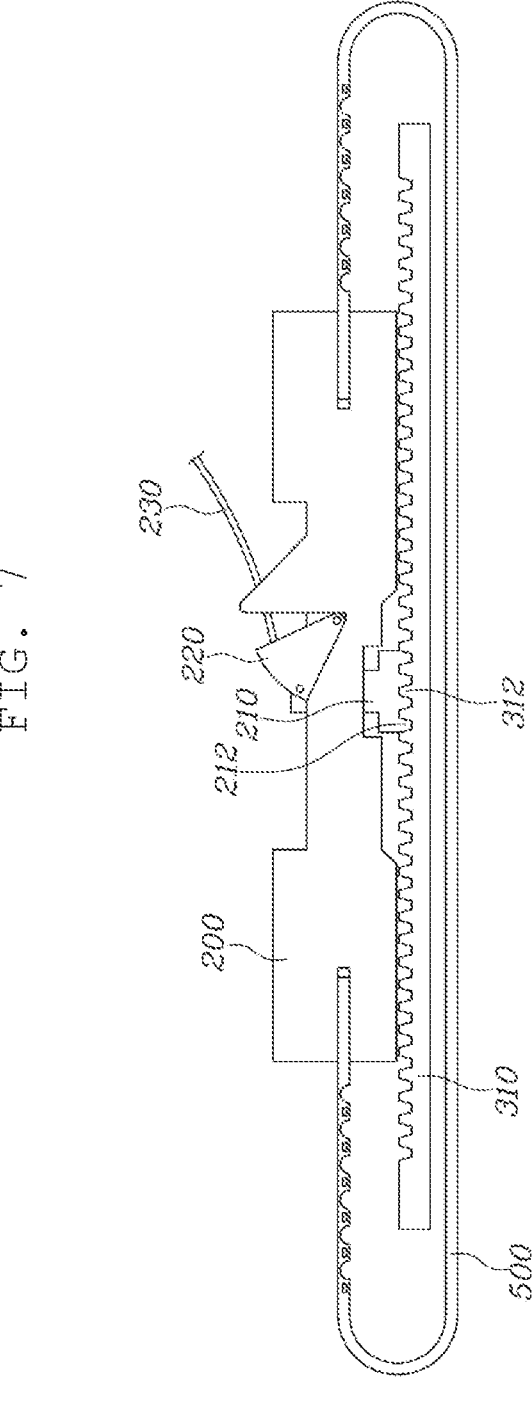
FIG. 7 is a view illustrating a shape of a groove cover in an embodiment, and a state in which a locker may be locked by being caught by a stopper.
Figure 8:
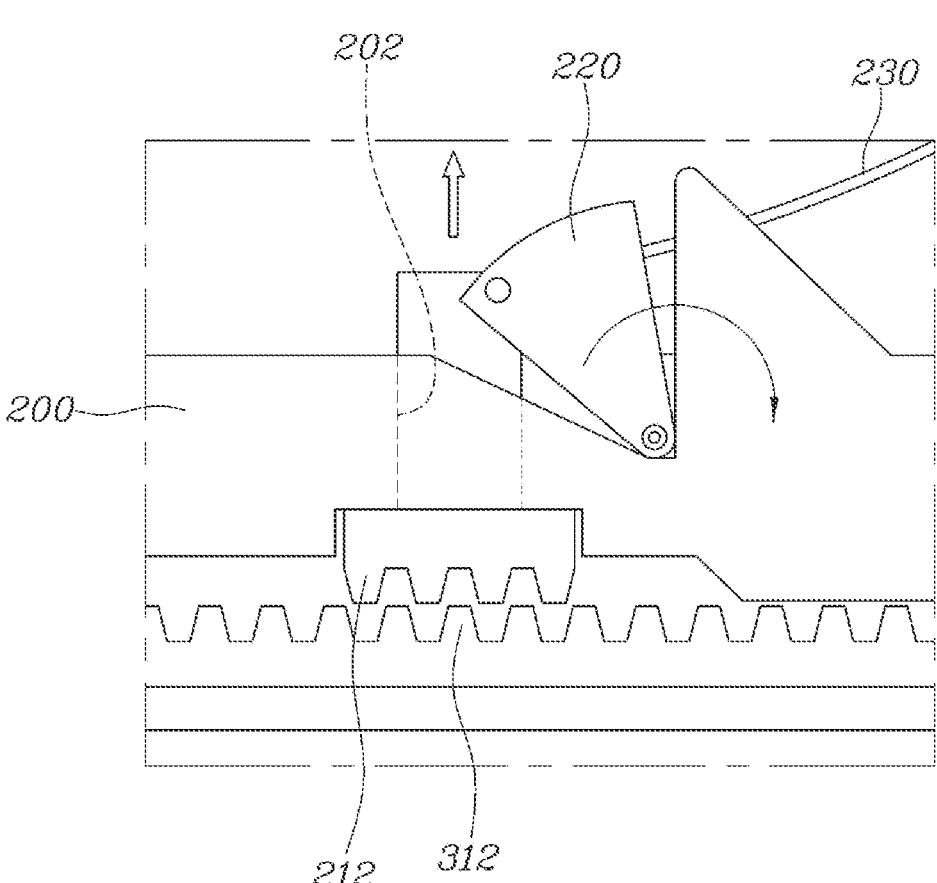
FIG. 8 is a view illustrating a state in which the locker is unlocked from the stopper by an operation of a trigger in an embodiment.

Further, in an embodiment, as illustrated in FIGS. 7 and 8, a guide hole 202 may be formed in the moving part 200. The locker 210 may be inserted into the guide hole 202, such that the locker 210 may move in a direction perpendicular to the longitudinal direction of the stopper 310.

With reference to FIGS. 6 to 8, in an embodiment, the stopper 310 may be installed in/on the rail part 300. The fixing gear teeth 312 may be formed on an upper surface of the stopper 310 in the forward/rearward longitudinal direction of the stopper 310. And, the fixing gear teeth 312 may be each formed in a rack gear shape, for example.

Further, as illustrated in FIG. 8, the guide hole 202 may be formed in an upward/downward longitudinal direction at a middle portion of the moving part 200. The locker 210 may be penetratively provided in the guide hole 202, such that the locker 210 moves upward or downward along the guide hole 202.

The locker 210 may be formed in a fork shape, for example. The moving gear teeth 212 may each have a rack gear shape formed on a bottom surface of a lower end of the locker 210 and located in the forward/rearward longitudinal direction.

In this case of an embodiment, because the moving gear teeth 212 and the fixing gear teeth 312 are formed in gear teeth shapes corresponding to each other, the moving part 200 may be locked to the stopper 310 when the moving gear teeth 212 engage with the fixing gear teeth 312.

In addition, the lock knob 240 may be installed at the periphery of the console 100 and operated manually. The lock knob 240 and the locker 210 may be connected by the cable 230, such that the locker 210 may be moved upward or downward by an operating force of the lock knob 240.

Therefore, in an embodiment, as illustrated in FIG. 8, when the lock knob 240 performs the unlocking operation, the locker 210 moves upward away from the stopper 310, such that the moving gear teeth 212 formed on the locker 210 disengage from the fixing gear teeth 312 formed on the stopper 310, and the locker 210 is unlocked from the stopper 310.

Further, in an embodiment, when the lock knob 240 performs a locking operation in the unlocked state of the locker 210, the locker 210 moves downward toward the stopper 310, such that the moving gear teeth 212 engage with the fixing gear teeth 312, and the locker 210 is locked to the stopper 310.

As described above, in an embodiment, the positions of the divided parts of the console 100 may be fixed as the gear teeth formed on the locker 210 engage with the gear teeth formed on the stopper 310. Therefore, the movement amount of the locker 210 in the forward/rearward direction movement may be adjusted in increments of the pitch of the gear teeth, such that the forward movement or rearward movement of the locker 210 may be finely adjusted, for example.

Moreover, because the divided parts of the console 100 may be moved manually, the movement of the console 100 need not be electrically controlled in an embodiment, and an expensive unit and controller are not required, which reduces costs, in comparison with a case in which the console 100 is moved by an electric mechanism.

Further, as illustrated in FIGS. 6 to 8, the locking device of an embodiment may further include a trigger 220 connected to the cable 230 and having two opposite ends connected between the moving part 200 and the locker 210 by a hinge structure. The trigger 220 may convert a rotational motion into a rectilinear motion of the locker 210 while being rotated by the operating force via the cable 230.

For example, with reference to FIGS. 7 and 8, in an embodiment, inclined surfaces may be formed on upper surfaces of the moving part 200 positioned at left and right sides of the guide hole 202. The trigger 220 may have a fan shape and may be placed on the inclined surfaces. A lower end of the trigger 220 may be hingedly coupled to lower ends of the inclined surfaces, such that the trigger 220 rotates about the lower end of the trigger 220.

Further, in an embodiment, a front portion of an upper end of the trigger 220 may be hingedly coupled to an upper end of the locker 210 protruding upward from the moving part 200, and a rear portion of the upper end of the trigger 220 may be connected to the cable 230.

Therefore, in such embodiment, when the cable 230 is pulled by the operation of the lock knob 240, the upper end of the trigger 220 connected to the cable 230 is rotated about the lower end of the trigger 220 while being pulled rearward, thereby moving the locker 210 upward.

Therefore, in such embodiment, the rotational motion of the trigger 220 is converted into the upward rectilinear motion of the locker 210, and the locker 210 moves upward, such that the locker 210 is unlocked from the stopper 310.

Figure 9:
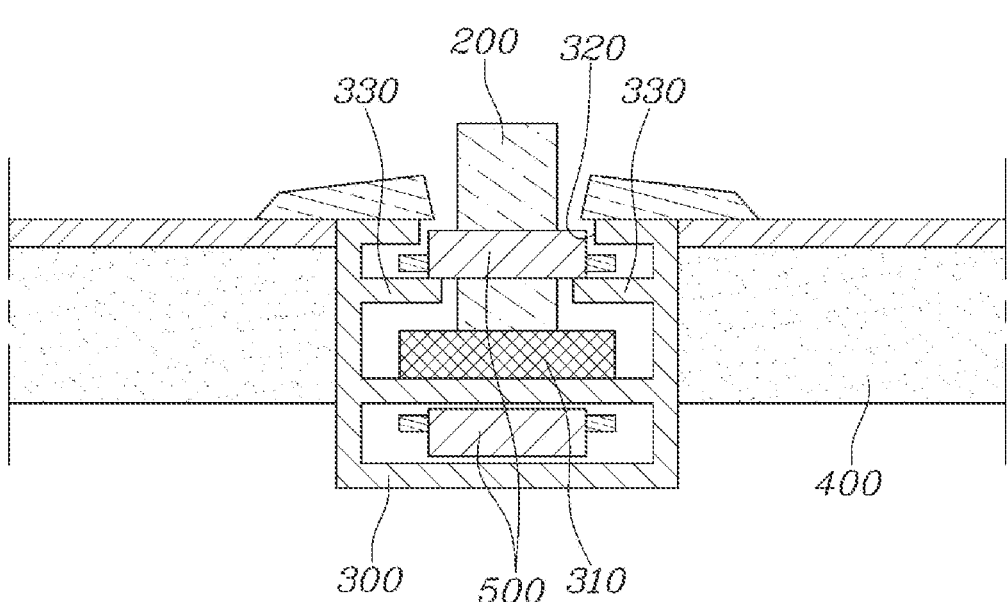
FIG. 9 is a cross-sectional view illustrating an interior of the rail part in an embodiment.

In an embodiment, as illustrated in FIGS. 7 and 9, an opening groove 320 may be formed at an upper end of the rail part 300, and a groove cover 500 may be coupled to front and rear sides of the moving part 200, such that the groove cover 500 may block the opening groove 320.

That is, as illustrated in FIG. 9, the groove cover 500 blocks the opening groove 320 formed in the rail part 300, such that introduction of foreign substances into the rail part 300 is reduced/prevented, which reduces/prevents contamination and breakdowns of devices caused by foreign substances.

Further, in an embodiment, a width of the groove cover 500 in a leftward/rightward width direction may be equal to or slightly shorter than a width of the opening groove 320 in the leftward/rightward width direction.

That is, as shown in FIG. 9, the groove cover 500 may be inserted into the opening groove 320 and may have a width suitable for a width of the opening groove 320, such that a gap is rarely formed between the groove cover 500 and the opening groove 320. Therefore, the groove cover 500 and a floor surface of an occupant compartment may define integrity, which may improve an external aesthetic appearance.

Further, as illustrated in FIG. 9, in an embodiment, a cover support portion 330 may be formed on a middle portion of the rail part 300 and protrude inward. As shown in FIGS. 7 and 9, the groove cover 500 may be formed in a belt shape that surrounds the cover support portion 330 and supported on the cover support portion 330.

For example, with reference to FIGS. 7 and 9, the groove cover 500 may be supported on an upper surface of the cover support portion 330 in a state in which a front end of the groove cover 500 is fixed to a front end of the moving part 200 and a rear end of the groove cover 500 is fixed to a rear end of the moving part 200.

In particular, the groove cover 500 may be formed in a belt shape, such that a middle portion of the groove cover 500, together with the stopper 310, extends to a lower portion of the cover support portion 330 and surrounds the stopper 310 and the cover support portion 330, for example.

Therefore, when the moving part 200 moves, the groove cover 500 may rotate while moving together with the moving part 200, and the groove cover 500 always covers the opening groove 320 even though the moving part 200 moves, thereby assuredly reducing/preventing foreign substances from being introduced into the rail part 300.

Further, as illustrated in FIG. 7, in an embodiment, the groove cover 500 may be formed in a belt shape of an endless track.

For example, the groove cover 500 may have a belt structure used for a tracked vehicle and be formed by continuously connecting quadrangular plates in the longitudinal direction of the groove cover 500.

In this case, the adjacent quadrangular plates may be connected by links, such that the groove cover 500 may rotate while defining a hemispherical shape at front and rear ends of the groove cover 500.

As described above, in an embodiment, the console 100 may be moved rearward in the state in which the parts of the console 100 are separated, such that the storage space S is additionally ensured between the front end part 100a and the rear end part 100b. Therefore, the convenience of storage may be improved, and the passenger, who is seated in the seat in the second row, may also use the storage space S defined in the rear end part 100b, thereby improving the utilization of the console 100.

Moreover, because the divided parts of the console 100 may be moved manually, the movement of the console 100 need not be electrically controlled, and an expensive unit and controller are not required, which reduces costs, in comparison with a case in which the console 100 is moved by an electric mechanism.

In addition, the groove cover 500 may block the opening groove 320 formed in the rail part 300, such that introduction of foreign substances into the rail part 300 is reduced/prevented, which reduces/prevents contamination and breakdowns of devices caused by foreign substances.

While embodiments have been described with reference to the specific examples, it is apparent to those skilled in the art that various modifications and alterations may be made within the technical spirit of the present disclosure, and these modifications and alterations belong to the appended claims.

What is claimed is:

1. A movable console for a vehicle, the movable console comprising:
    a console divided into parts in a forward/rearward direction, the divided parts being configured to rectilinearly move forward or rearward relative to a vehicle body;
    partition walls shaped to block left and right sides of a space between the divided parts to define a storage space;
    rail parts provided in the forward/rearward direction on a bottom surface of the vehicle body;
    moving parts fixed to the divided parts and configured to rectilinearly move along the rail parts;
    a locking device configured to restrict positions of the divided parts by locking or unlocking the moving parts to or from the rail parts in response to an operation of a lock knob;
    an opening groove formed at an upper end of a rail part of the rail parts; and
    a groove cover coupled to front and rear sides of the moving parts, the groove cover being configured to block at least part of the opening groove.

2. The movable console of claim 1, wherein the partition walls are provided on one of the divided parts, and further comprising insertion holes formed in the other of the divided parts that faces the partition walls, wherein the partition walls are configured to be inserted into the insertion holes.

3. The movable console of claim 1, wherein the locking device comprises:

a stopper disposed in the rail part and having fixing gear teeth formed in a longitudinal direction of the rail part; and a locker provided on a moving part of the moving parts and having moving gear teeth formed to be directed toward the fixing gear teeth, the locker being configured to transmit an operating force of the lock knob via a cable and configured to be moved by the operation of the lock knob such that the locker is locked to the stopper in response to the moving gear teeth engaging with the fixing gear teeth and the locker is unlocked from the stopper in response to the moving gear teeth being disengaged from the fixing gear teeth.

4. The movable console of claim 3, further comprising a guide hole formed in the moving part, the locker being inserted into the guide hole, such that the locker is configured to move in a direction perpendicular to a longitudinal direction of the stopper.

5. The movable console of claim 3, wherein the fixing gear teeth and the moving gear teeth are each formed in a rack gear shape.

6. The movable console of claim 3, further comprising a trigger coupled to the cable and having two opposite ends coupled between the moving part and the locker by a hinge structure, the trigger being configured to convert a rotational motion into a rectilinear motion of the locker in response to being rotated by an operating force of the cable.

7. The movable console of claim 1, wherein a width of the groove cover in a leftward/rightward width direction is equal to or slightly shorter than a width of the opening groove in the leftward/rightward width direction.

8. The movable console of claim 1, further comprising a cover support portion formed on a middle portion of the rail part and protruding inward, the groove cover being supported on the cover support portion and formed in a belt shape configured to surround the cover support portion.

9. The movable console of claim 8, wherein the groove cover is formed in a belt shape.

10. A movable console for a vehicle, comprising:

a first part;

a second part, the second part being movable relative to the first part;

a left partition wall extending from a first face of the first part toward the second part;

a right partition wall extending from the first face of the first part toward the second part;

a left insertion hole formed on a second face of the second part, wherein the left partition wall is configured to movably slide and fit into the left insertion hole;

a right insertion hole formed on the second face of the second part, wherein the right partition wall is configured to movably slide and fit into the right insertion hole;

a fixed rail configured to be attached to the vehicle;

a movable block attached to the second part;

bearing wheels attached to and extending from the movable block, such that the movable block is configured to slidably engage with the fixed rail via the bearing wheels for forward/rearward movement of the second part relative to the first part;

an upper lip and a lower lip extending from the fixed rail to define a groove opening in the fixed rail between the upper lip and the lower lip; and a groove cover configured to slidably engage within the groove opening and configured to at least partially seal parts of the fixed rail and the movable block relative to an environment outside of the movable console;

wherein the movable console is movably configurable to include a storage space defined between the left partition wall, the right partition wall, the first face of the first part, and the second face of the second part.

11. The movable console of claim 10, further comprising:

a set of fixed gear teeth on the fixed rail;

a guide hole in the movable block;

a locker configured to slidably fit within the guide hole; and a set of movable gear teeth on the locker, wherein the set of movable gear teeth is configured to engage with the set of fixed gear teeth to lock a position of the second part relative to the first part.

12. The movable console of claim 11, further comprising:

a lock knob attached to the second part;

a trigger pivotably coupled to the movable block, the trigger being coupled to the locker; and a cable coupled between the lock knob and the trigger, wherein the lock knob is configured to actuate the locker via the cable and the trigger.

13. The movable console of claim 10, wherein a width of the groove cover in a leftward/rightward width direction is equal to or less than a width of the groove opening in the leftward/rightward width direction.

14. The movable console of claim 10, wherein the groove cover has a belt shape.

15. The movable console of claim 10, wherein a first end of the groove cover is attached to a front side of the movable block, wherein a second end of the groove cover is attached to a rear side of the movable block, wherein the groove cover curves ahead of and is a first spaced distance from the front side of the movable block, wherein the groove cover curves behind and is a second spaced distance from the rear side of the movable block, and wherein the groove cover extends along a lower region below a set of fixed gear teeth of the fixed rail.

16. A movable console for a vehicle, comprising:

a front end part;

a rear end part, the rear end part being movable relative to the front end part;

a left partition wall extending rearward from a rear face of the front end part;

a right partition wall extending rearward from the rear face of the front end part;

a left insertion hole formed on a front face of the rear end part, wherein the left partition wall is configured to movably slide and fit into the left insertion hole;

a right insertion hole formed on the front face of the rear end part, wherein the right partition wall is configured to movably slide and fit into the right insertion hole, wherein the movable console is movably configurable to include a storage space defined between the left partition wall, the right partition wall, the rear face of the front end part, and the front face of the rear end part;

a fixed rail configured to be attached to the vehicle;

a rear movable block attached to the rear end part;

bearing wheels attached to and extending from the rear movable block, such that the rear movable block is configured to slidably engage with the fixed rail via the bearing wheels for forward/rearward movement of the rear end part relative to the front end part;

a set of fixed gear teeth on the fixed rail;

a guide hole in the rear movable block;

a locker configured to slidably fit within the guide hole;

a set of movable gear teeth on the locker, wherein the set of movable gear teeth is configured to engage with the set of fixed gear teeth to lock a position of the rear end part relative to the front end part;

a lock knob attached to the rear end part;

a trigger pivotably coupled to the rear movable block, the trigger being coupled to the locker;

a cable coupled between the lock knob and the trigger, wherein the lock knob is configured to actuate the locker via the cable and the trigger;

an upper lip and a lower lip extending from the fixed rail to define a groove opening in the fixed rail between the upper lip and the lower lip; and a groove cover configured to slidably engage within the groove opening.

17. The movable console of claim 16, wherein a width of the groove cover in a leftward/rightward width direction is equal to or less than a width of the groove opening in the leftward/rightward width direction.

18. The movable console of claim 16, wherein the groove cover has a belt shape.

19. The movable console of claim 16, wherein a first end of the groove cover is attached to a front side of the rear movable block, wherein a second end of the groove cover is attached to a rear side of the rear movable block, and wherein the groove cover curves ahead of and is a first spaced distance from the front side of the rear movable block.

20. The movable console of claim 19, wherein the groove cover curves behind and is a second spaced distance from the rear side of the rear movable block, and the groove cover extends along a lower region below the set of fixed gear teeth of the fixed rail.

\* \* \* \* \*